United States Patent
Barinov

(10) Patent No.: US 10,433,408 B2
(45) Date of Patent: Oct. 1, 2019

(54) METHODS FOR AFFECTING SPINNING ATMOSPHERIC PHENOMENA

(71) Applicant: New York University, New York, NY (US)

(72) Inventor: Victor Barinov, Brooklyn, NY (US)

(73) Assignee: New York University, New York, NY (US)

( * ) Notice: Subject to any disclaimer, the term of this patent is extended or adjusted under 35 U.S.C. 154(b) by 593 days.

(21) Appl. No.: 14/791,298

(22) Filed: Jul. 3, 2015

(65) Prior Publication Data

US 2015/0359076 A1 Dec. 10, 2015

Related U.S. Application Data

(62) Division of application No. 12/497,638, filed on Jul. 3, 2009, now abandoned.

(51) Int. Cl.
*A01G 15/00* (2006.01)
*H05F 1/00* (2006.01)

(52) U.S. Cl.
CPC .............. *H05F 1/00* (2013.01); *A01G 15/00* (2013.01)

(58) Field of Classification Search
CPC .................................. H05F 1/00; A01G 15/00
See application file for complete search history.

(56) References Cited

U.S. PATENT DOCUMENTS

| | | | |
|---|---|---|---|
| 2002/0088364 A1 | 7/2002 | Feldman | |
| 2003/0085296 A1 | 5/2003 | Waxmanski | |
| 2005/0039626 A1 | 2/2005 | Yi | |
| 2006/0284004 A1* | 12/2006 | Jones | A01G 15/00 244/33 |
| 2008/0283386 A1* | 11/2008 | Kaufman | H01Q 1/366 204/164 |

FOREIGN PATENT DOCUMENTS

RU 2036577 C1 * 6/1995
RU 2060639 C1 * 5/1996

* cited by examiner

*Primary Examiner* — Scott Bauer
(74) *Attorney, Agent, or Firm* — Laurence P. Colton; Smith Tempel Blaha LLC

(57) ABSTRACT

A system and method for misbalancing or suppressing spinning atmospheric phenomena such as tornadoes, landspouts, waterspouts, gustnadoes and whirlwinds. The systems and methods misbalance or suppress such phenomena utilizing electromagnetic fields; irradiation; neutralizing charges; or chemical reactions, thus destabilizing or disrupting the phenomenon.

2 Claims, 15 Drawing Sheets

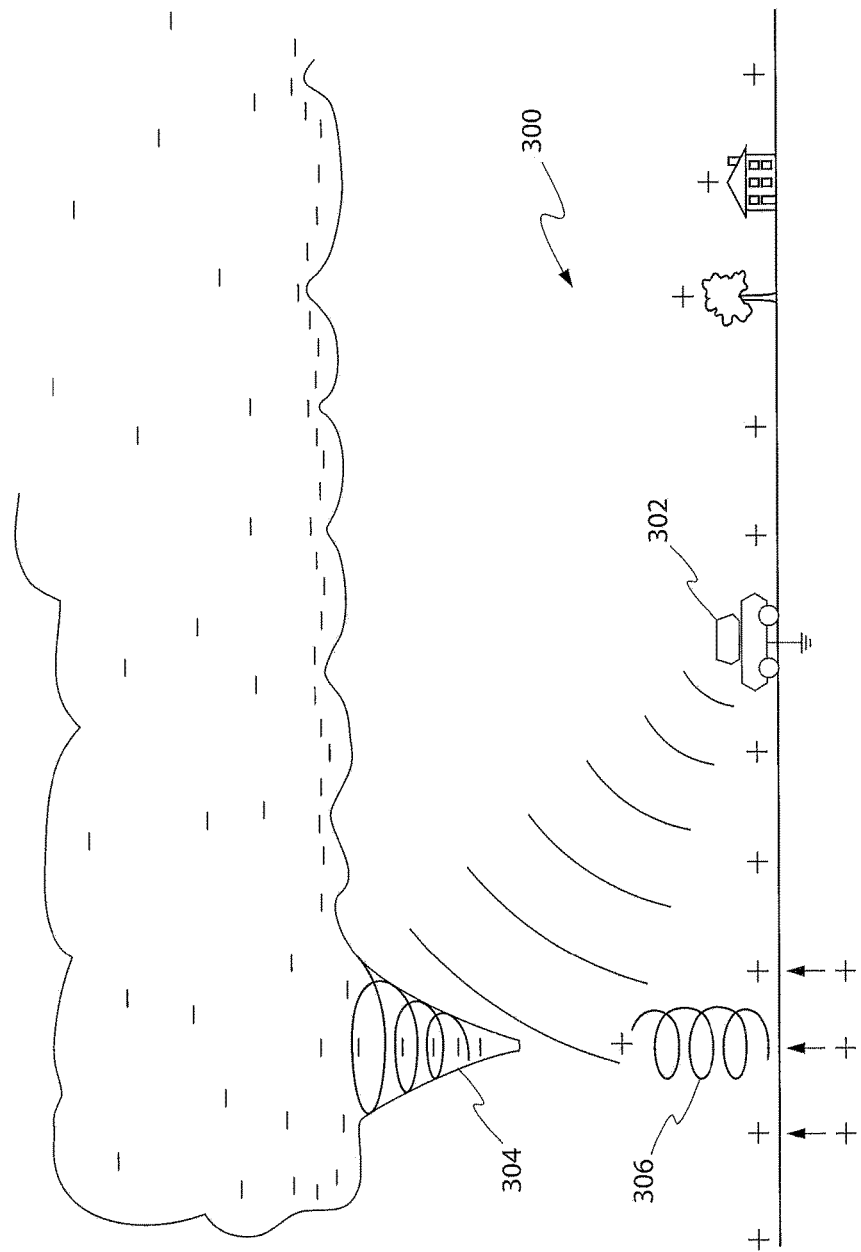

METHODS FOR AFFECTING SPINNING ATMOSPHERIC PHENOMENA

STATEMENT OF RELATED APPLICATIONS

This application is a divisional of and claims the benefit of U.S. patent application Ser. No. 12/497,638 having a filing date of 3 Jul. 2009, which is based on and claims the benefit of U.S. Provisional Patent Application No. 61/133,801 having a filing date of 3 Jul. 2008.

BACKGROUND OF THE INVENTION

1. Technical Field

This invention relates to weather control in meteorology, and, more specifically, to the area of protection from spinning atmospheric phenomena such as tornadoes.

2. Related Art

A tornado is defined by the Glossary of Meteorology as "a violently rotating column of air, in contact with the ground, either pendant from a cumuliform cloud or underneath a cumuliform cloud, and often (but not always) visible as a funnel cloud . . . ." Glossary of Meteorology, Second Edition; American Meteorological Society (2000) (retrieved on 2006 Nov. 17). Tornadoes typically comprise a visible condensation funnel narrowing from top to bottom, and whose bottom end touches the Earth. Tornadoes often also are encircled by a cloud of debris. A tornado is not necessarily visible; however, the intense low pressure caused by the high wind speeds (see Bernoulli's principle) and rapid rotation (due to cyclostrophic balance) usually causes water vapor in the air to condense into a visible condensation funnel. Edwards, Roger (2006 Apr. 4); The Online Tornado FAQ; Storm Prediction Center (retrieved on 2006 Sep. 8). Many tornadoes are preceded by a funnel cloud as the mesocyclonic rotation descends toward the ground. Most tornadoes produce strong winds at the surface while the visible funnel is still above the ground, so it is difficult to tell the difference between a funnel cloud and a tornado from a distance. Hallam Nebraska Tornado; Omaha/Valley, Nebr. Weather Forecast Office (2005 Oct. 2) (retrieved on 2006 Sep. 8).

Tornadoes normally rotate cyclonically in direction (counterclockwise in the northern hemisphere, clockwise in the southern). Approximately 1% of tornadoes rotate in an anticyclonic direction. Typically, only landspouts and gustnados rotate anticyclonically, and usually only those which form on the anticyclonic shear side of the descending rear flank downdraft in a cyclonic supercell. Forbes, Greg; weather.com—Blog: The Weather Channel on weather news, hurricanes, tornadoes & meteorology. (accessed 2006 Dec. 30). However, on rare occasions, anticyclonic tornadoes form in association with the mesoanticyclone of an anticyclonic supercell, in the same manner as the typical cyclonic tornado, or as a companion tornado—either as a satellite tornado or associated with anticyclonic eddies within a supercell. Monteverdi, John (2003 Jan. 25); Sunnyvale and Los Altos, Calif. Tornadoes May 4, 1998. (accessed 2006 Oct. 20).

The first sign of an approaching tornado may be light rain, followed by heavier rain, then rained mixed with hail. The hailstones may grow to the size of golf balls or even baseballs. After the hail ends, a tornado may strike. First, the rotating cloud base lowers. This lowering becomes a funnel, which continues descending while winds build near the surface, kicking up dust and other debris. Finally, the visible funnel extends to the ground, and the tornado begins causing major damage. Tornado, Wikipedia, http://en.wikipedia.org/wiki/Tornado.

Most tornadoes from supercells follow a recognizable life cycle. Doswell, Moller, Anderson et al. (2005); Advanced Spotters' Field Guide (PDF); US Department of Commerce. That begins when increasing rainfall drags with it an area of quickly descending air known as the rear flank downdraft (RFD). This downdraft accelerates as it approaches the ground, and drags the supercell's rotating mesocyclone towards the ground with it. As the mesocyclone approaches the ground, a visible condensation funnel appears to descend from the base of the storm, often from a rotating wall cloud. As the funnel descends, the RFD also reaches the ground, creating a gust front that can cause damage a good distance from the tornado. Usually, the funnel cloud becomes a tornado within minutes of the RFD reaching the ground. Tornado, Wikipedia, http://en.wikipedia.org/wiki/Tornado.

Tornadoes occasionally accompany tropical storms and hurricanes that move over land. Tornadoes are most common to the right and ahead of the path of the storm center as it comes onshore. Some tornadoes may form during the early stages of rapidly developing thunderstorms. Tornadoes may appear nearly transparent until dust and debris are picked up. A Preparedness Guide Including Safety Information for Schools; U.S. Department of Commerce, National Oceanic and Atmospheric Administration, National Weather Service; September 1992 (NOAA, FEMA, The American Red Cross).

Electric currents accompany tornado activity. Marx Brook, Electric Currents Accompanying Tornado Activity, *Science,* 22 Sep. 1967: Vol. 157. No. 3795, pp. 1434-1436. A tornado wall acts as an electrical generator. Grigor'ev, A. I., Sinkevich, O. A.; Nature of electrical phenomena in tornado funnels; Soviet Physics-Technical Physics, October 1986, Vol. 31, pp. 1185, 1186. Tornadoes emit on the electromagnetic spectrum, for example, with sferics and E-field effects detected. Bluestein, Howard (August 1999); "A History of Severe-Storm-Intercept Field Programs"; Weather and Forecasting 14 (4): 558-577. Samaras, Tim M; (October 2004); "A Historical Perspective of In-Situ Observations within Tornado Cores"; Preprints of the 22nd Conference on Severe Local Storms, Hyannis, Mass.: American Meteorological Society. The processes of energy conversion in tropical cyclones, hurricanes and tornadoes are discussed in Krasilnikov, E. Y. (1997), Electromagnetohydrodynamic nature of tropical cyclones, hurricanes, and tornadoes, *J. Geophys. Res.,* 1997, 102(D12), pp. 13,571-13,580, which is incorporated herein by reference.

Correlations with patterns of lightning activity have also been observed, but little in way of consistent correlations have been advanced. Tornadic storms do not contain more lightning than other storms, and some tornadic cells never contain lightning. More often than not, overall cloud-to-ground (CG) lightning activity decreases as a tornado reaches the surface and returns to the baseline level when the tornado lifts. In many cases, very intense tornadoes and thunderstorms exhibit an increased and anomalous dominance in positive polarity CG discharges. Perez, Antony H., Louis J. Wicker, and Richard E. Orville (September 1997); "Characteristics of Cloud-to-Ground Lightning Associated with Violent Tornadoes"; Weather and Forecasting 12 (3): 428-437. At the same time many authors believe that "electromagnetics and lightning have little to nothing to do directly with what drives tornadoes (tornadoes are basically a thermodynamic phenomenon), though there are likely connections with the storm and environment affecting both phenomena" Tornado, Wikipedia, http://en.wikipedia.org/wiki/Tornado.

There is an opinion in favor of the importance of electrical energy in the mechanism of tornado initiation and growth. Vonnegut, V., and C. B. Moore, 1957: Electrical activity associated with the Blackwell-Udal tornado. J. Meteor., 14, 284-285. It is advocated that not only is there a significant factor to be found in the electrical activity but that the earth's magnetic field is also important. These parameters are believed to be especially significant during the initial phases of the storm. Rathbun, E. R., 1960: An electromagnetic basis for the initiation of a tornado; J. Meteor., 17, 371-373.

The precursor of any atmospheric discharge is the polarization of positive and negative charges within a storm cloud. The tops of the storm clouds are known to acquire an excess of positive charge and the bottom of the storm clouds acquire an excess of negative charge. Two mechanisms seem important to the polarization process. One mechanism involves a separation of charge by a process, which bears resemblance to frictional charging. Clouds are known to contain countless millions of suspended water droplets and ice particles moving and whirling about in turbulent fashion. Additional water from the ground evaporates, rises upward and forms clusters of droplets as it approaches a cloud. This upwardly rising moisture collides with water droplets within the clouds. In the collisions, electrons are ripped off the rising droplets, causing a separation of negative electrons from a positively-charged water droplet or cluster of droplets. The second mechanism, which contributes to the polarization of a storm cloud involves a freezing process. Rising moisture encounters cooler temperatures at higher altitudes. These cooler temperatures cause the cluster of water droplets to undergo freezing. The frozen particles tend to cluster more tightly together and form the central regions of the cluster of droplets. The frozen portion of the cluster of rising moisture becomes negatively charged and the outer droplets acquire a positive charge. Air currents within the clouds can rip the outer portions off the clusters and carry them upward toward the top of the clouds. The frozen portion of the droplets, with their negative charge tend to gravitate towards the bottom of the storm clouds. Thus, the clouds become further polarized. These two mechanisms are believed to be the primary causes of the polarization of storm clouds. In the end, a storm cloud becomes polarized with positive charges carried to the upper portions of the clouds and negative portions gravitating towards the bottom of the clouds. The polarization of the clouds has an equally important effect on the surface of the Earth. The cloud's electric field stretches through the space surrounding it and induces movement of electrons upon Earth. Electrons on Earth's outer surface are repelled by the negatively-charged cloud's bottom surface. This creates an opposite charge on the Earth's surface. Buildings, trees and even people can experience a buildup of static charge as electrons are repelled by the cloud's bottom. Lightning, Wikipedia, http://en.wikipedia.org/wiki/Lightning.

As the static charge buildup in a storm cloud increases, the electric field surrounding the cloud becomes stronger. Normally, the air surrounding a cloud would be a good enough insulator to prevent a discharge of electrons to Earth. Yet, the strong electric fields surrounding a cloud are capable of ionizing the surrounding air and making it more conductive. The ionization involves the shredding of electrons from the outer shells of gas molecules. The gas molecules which compose air are thus turned into a soup of positive ions and free electrons. The insulating air is transformed into a conductive plasma. The ability of a storm cloud's electric fields to transform air into a conductor makes charge transfer (in the form of a lightning bolt) from the cloud to the ground (or even to other clouds) possible. Lightning, Wikipedia, http://en.wikipedia.org/wiki/Lightning.

A dusty plasma is a plasma containing nanometer or micrometer-sized particles suspended in it. Dust particles may be charged and the plasma and particles behave as a plasma, following electromagnetic laws for particle up to about 10 nm (or 100 nm if large charges are present). Dusty Plasmas: Physics, Chemistry and Technological Impacts in Plasma Processing, John Wiley & Sons Ltd., 1999. Merlino, Robert L., "Experimental Investigations of Dusty Plasmas" (2005). Dust particles may acrete into larger particles resulting in "grain plasmas".

Several US patent publications disclose methods for affecting tornadoes. US Patent Publication No. 2002/0088364 discloses a method and apparatus for the destabilization and destruction of a tornado comprising the delivery of normally liquid fuel-air explosive in the preferably chosen areas of this phenomena by pilotless fuel delivery means. The fuel is released, dispersed and mixed up with rotating air masses and through predetermined time this aerosol cloud blown up. Strong shock wave scatters air masses, destroys a uniform rotating flow of air and thus destroys tornado.

US Patent Publication No. 2003/0085296 discloses a method for affecting the formation and/or direction of a low atmospheric weather system. Audio generators are positioned to project sound waves toward a peripheral area of a weather system. The sound waves are generated at a frequency to affect the formation of the weather system in a manner to disrupt, enhance or direct the formation.

US Patent Publication No. 2005/0039626 discloses a system for preventing damage from tornados and other harmful naturally occurring weather phenomenon by using multiple jet devices distributed in a ground array to produce man made tornadoes. The man made tornadoes function to divert or stop the natural tornadoes. Explosive devices can also be used with the man made tornadoes to stop the natural tornadoes.

BRIEF SUMMARY OF THE INVENTION

The systems and methods for misbalancing and suppressing the natural electromagnetic component of spinning atmospheric phenomena, such as tornadoes, by applying an external electromagnetic field; by energy conversion; by affecting the natural electric field; and/or by neutralizing charges of spinning currents. Such systems and methods interfere with the natural electric charges and electromagnetic field of a spinning atmospheric phenomenon, thus destabilizing or disrupting the phenomenon.

BRIEF DESCRIPTION OF THE DRAWINGS

FIG. 2A shows an xyz system of coordinates for a charged particle affected by wind.

FIG. 2B shows a particle affected by wind, an electric field between the Earth's surface and clouds.

FIG. 2C shows a positively charged particle moving upward spinning in the Earth's magnetic field in the northern hemisphere.

FIG. 2D shows a positively charged particle moving upward in the current following a magnetic field line in the northern hemisphere (Birkeland currents are also known as field-aligned currents).

FIG. 15 shows a system for suppressing a tornado, which said suppressing system comprises a source of ultrasound.

DETAILED DESCRIPTION OF EMBODIMENTS OF THE INVENTION

Formation of Tornado

From the electromagnetic prospective a tornado is a current, or an electric current, or flow of charged particles. The formation, development and movement of a spinning atmospheric phenomenon such as a tornado, landspout, waterspout, gustnado, whirlwind, and tropical cyclone requires the balance of acting fields supporting the formation, development and movement of the spinning atmospheric phenomenon. A tropical cyclone also is referred to by other names, such as cyclone, hurricane, typhoon, tropical storm, cyclonic storm, tropical depression and tornado cyclone.

Figure 1:
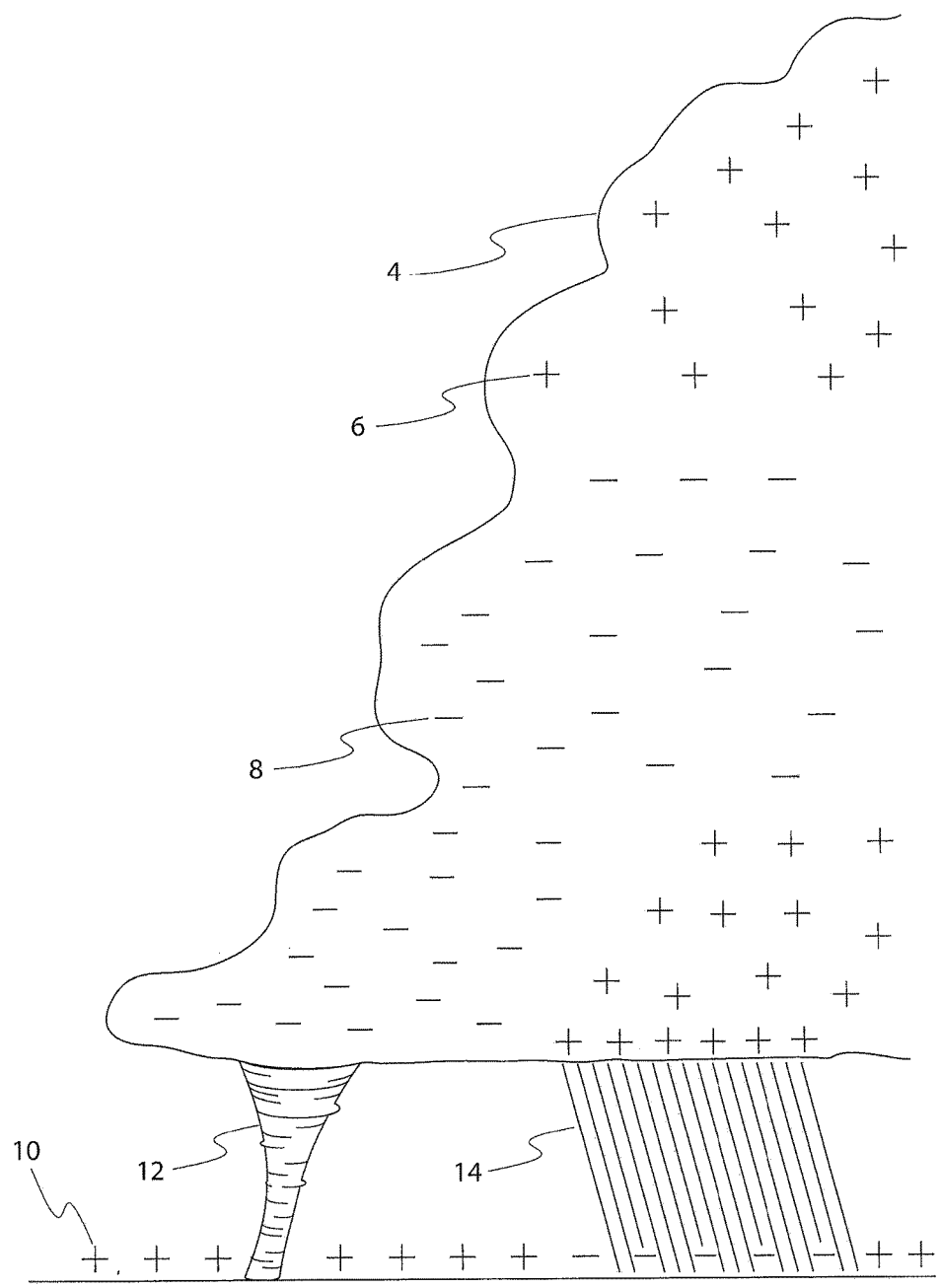
FIG. 1 shows the polarization of storm clouds and Earth's surface.

Referring now to FIG. 1, the precursor of any atmospheric current—lightning strike, tornado, etc.—is the polarization of positive and negative charges within a storm cloud. With the cloud 4 polarized into opposite positive 6 and negative 8 charges, and with positive charges 10 induced upon Earth's surface, the stage is set for a lightning strike (not shown) or a tornado 12. Generally, if ionizing the surrounding air is not enough for development of a lightning bolt at given local area, conditions leading to a tornado may develop. Rain 14 may change the distribution of the charges 6 and 8.

Electrons on Earth's outer surface are repelled by the negatively charged bottom of clouds. This creates an opposite positive charge on the Earth's surface. Buildings, trees and even people can experience a buildup of static charge as electrons are repelled by the cloud's negatively charged bottom. If we place a small positive test charge $q_o$ at some point between clouds and the Earth's surface, there will be a force exerted on $q_o$ due to the other charges. The force on $q_o$ due to electromagnetic fields is the Lorentz force, which is given by the following equation $$\vec{F} = q_0(\vec{E} + \vec{v} \times \vec{B}) \quad (1)$$

where $\vec{E}$ is the electric field and $\vec{B}$ is the magnetic field.

The net force $\vec{F}_E$ due to electric field $\vec{E}$ is the vector sum of the individual forces exerted on $q_o$ by each of the other charges in the system. As each of these forces is proportional to $q_o$, the net force also will be proportional to $q_o$. The electric field at a point is this force divided by $q_o$:

$$E = \frac{\vec{F}_E}{q_0} \quad (2)$$

Strong near-Earth-surface winds can affect and raise particles above the ground level. Some of the raised particles carry a positive charge. A charged particle is affected by a cloud-Earth's surface electric field and has a tendency for upward movement. Both the effects of winds and the electric field cause the particle to move at none-zero angle to the normal to the Earth surface.

When a charged particle moves in the Earth's magnetic field $\vec{B}$ with its velocity $\vec{v}$ at some arbitrary angle with respect to $\vec{B}$, the magnetic force $\vec{F}_B$ exerted on a charge $q_o$ according to the equation:

$$\vec{F}_B = q_o \vec{v} \times \vec{B} \quad (3)$$

Particles affected by force of wind and force of electric field move in arbitrary directions. Particles that are traveling in a direction not parallel to the Earth's magnetic field are affected by the Earth's magnetic field. According to equation (3) positively charged particles start spinning counterclockwise in the northern hemisphere. A spinning column rises above the ground level and is known as a rotating wall cloud. The spinning column forms an inductor, which inductor develops additional magnetic field.

Figure 2A:
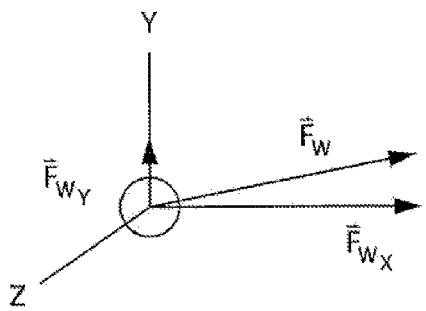
FIGS. 2A-2D show a particle affected by wind, an electric field between the Earth's surface and clouds, and the Earth's magnetic field.
Figure 2B:
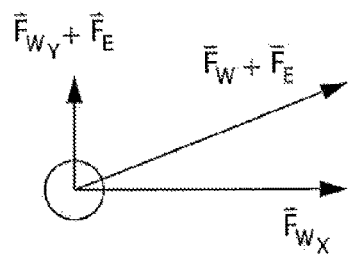
Figure 2C:
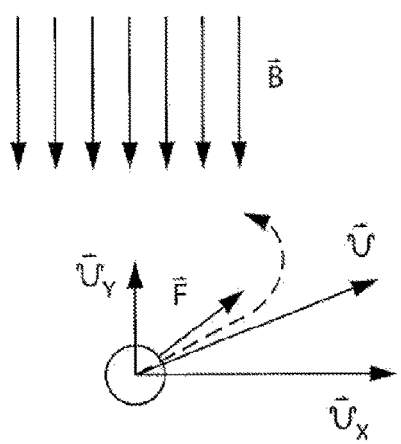
Figure 2D:
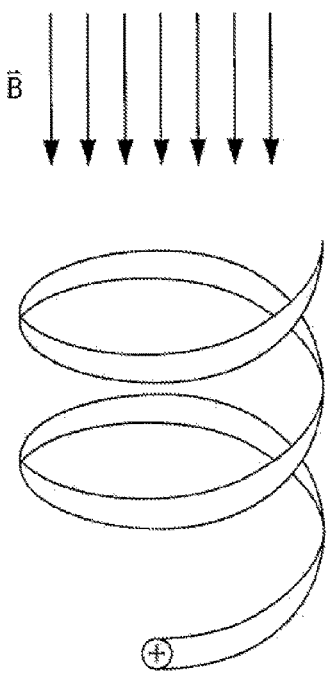

Referring now to FIGS. 2A-2D, the spinning properties of the spinning column depend on a cloud-ground electric field, the magnetic field at the given area, the nature and charge of the spinning particles, and the moisture in air leading to discharge. FIG. 2A shows an xyz system of coordinates for a particle carrying a charge. For simplicity a wind propagation direction is chosen to be in xy-plane. FIG. 2B shows how the particle is affected by forces caused by wind $\vec{F}_w$ and an electric field $\vec{F}_E$. FIG. 2C shows a positively charged particle moving upward spinning in the Earth's magnetic field in the Northern hemisphere. FIG. 2D shows a positively charged particle moving upward in the current following a magnetic field line, which is an example of Birkeland currents, also known as field-aligned currents.

Figure 3:
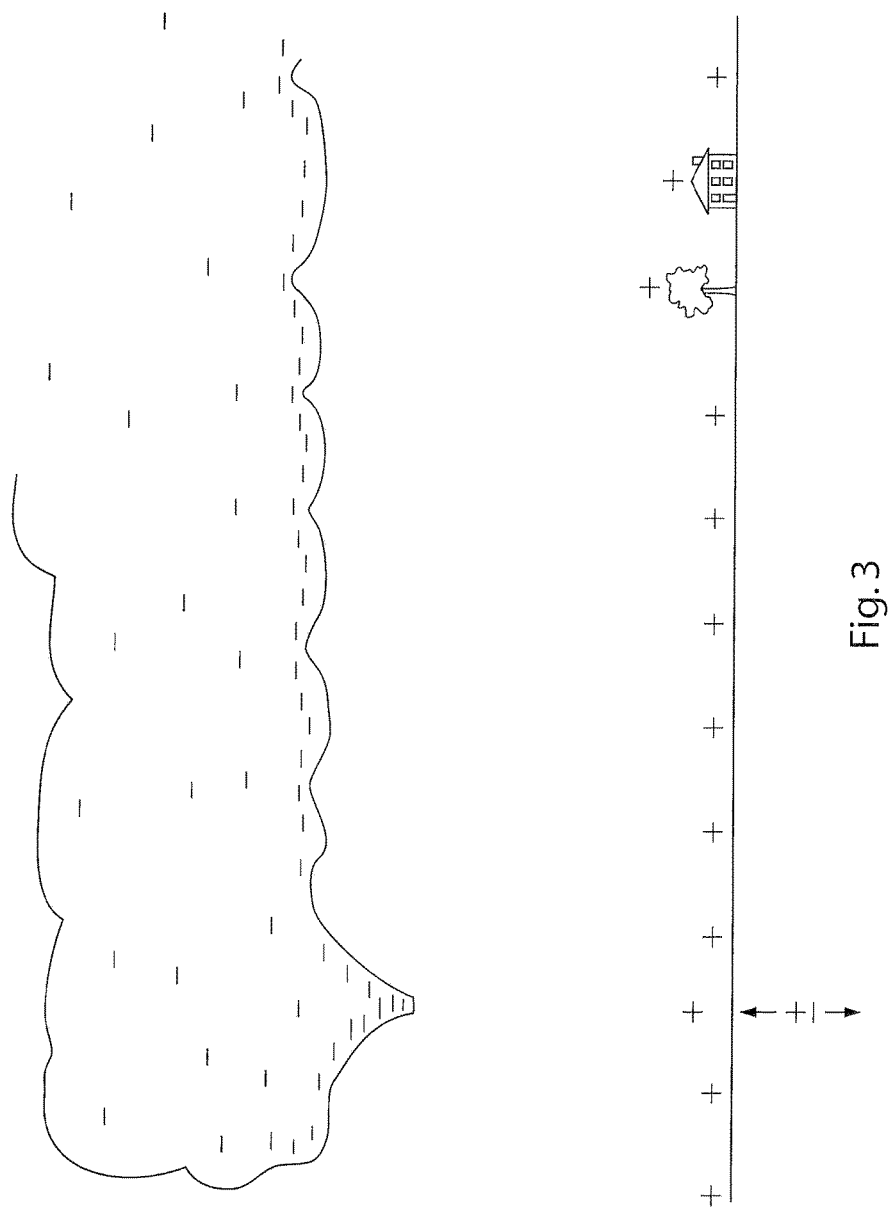
FIG. 3 shows the area of development of negatively charged cloud bottom and positive charges induced on the Earth's surface.
Figure 4:
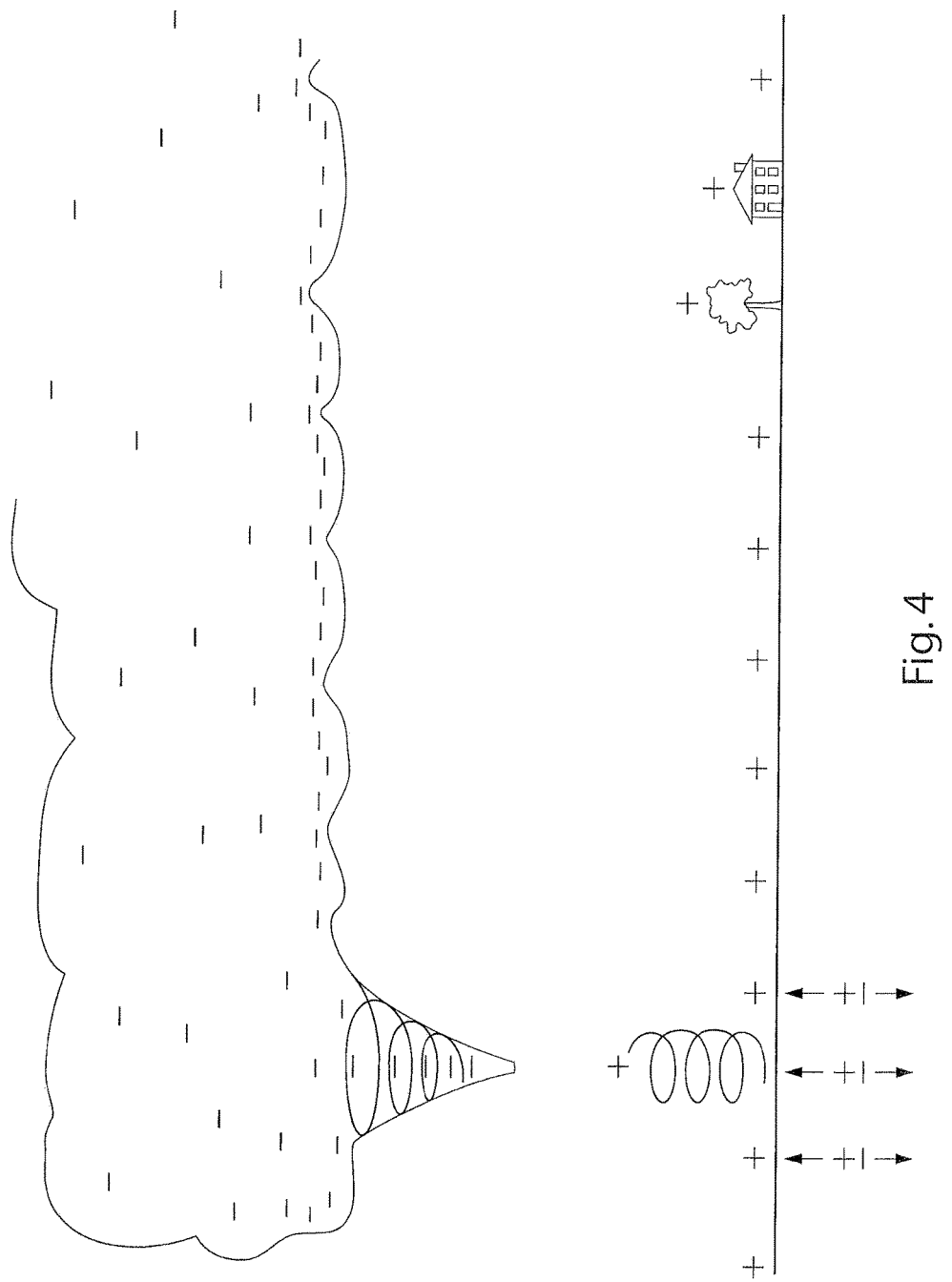
FIG. 4 shows a descending rear flank downdraft and an upward wall cloud anticipating touch dawn of a tornado.
Figure 5:
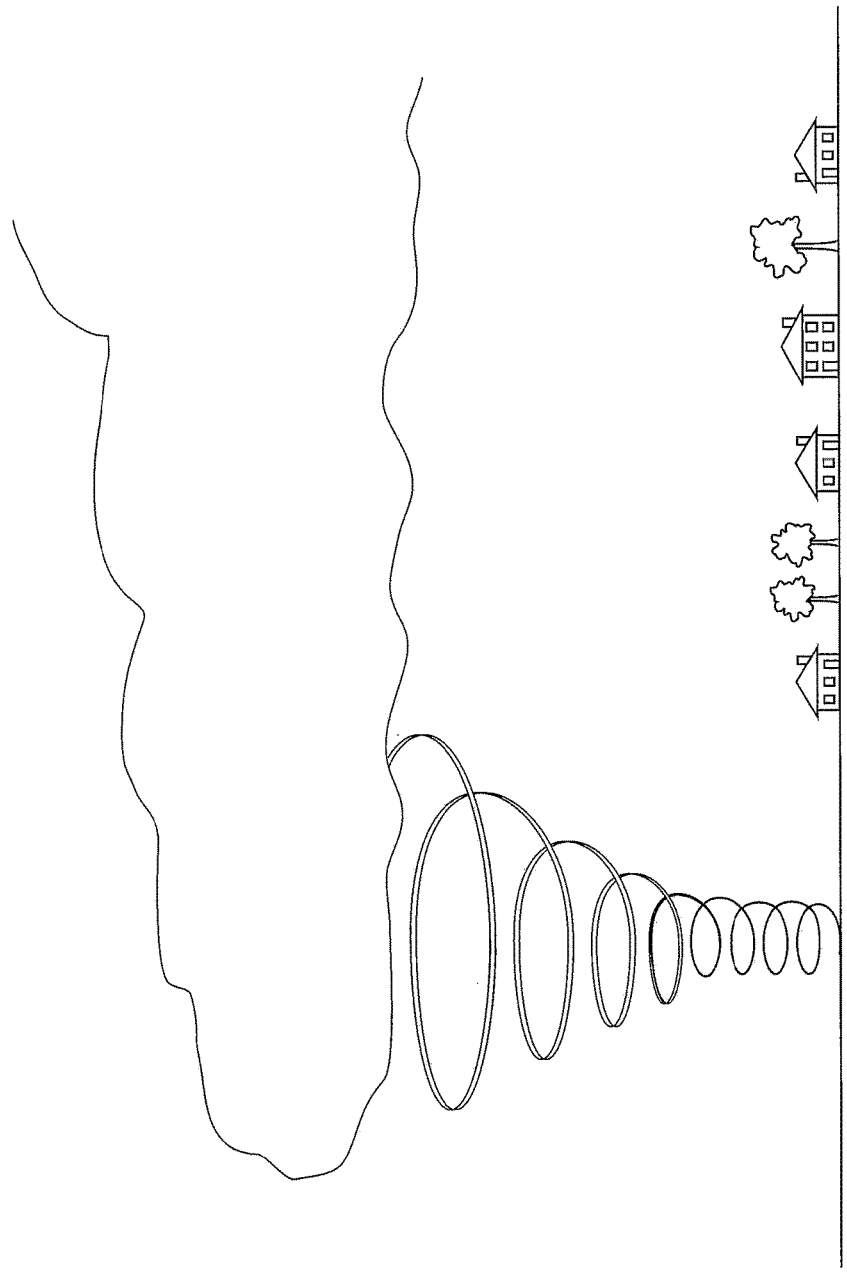
FIG. 5 shows a schematic view of tornado structure.

Referring now to FIG. 3, as long as the negatively charged cloud bottom is in the area, new positive charges will be induced on the Earth's surface particles at the given area of the Earth's surface. Referring now to FIG. 4, at some point in time a portion of negatively charged cloud begins to quickly descend towards the spinning positive charges. Moving downward negatively-charged particles rotate clockwise if we see them from the top view, or counterclockwise if we them from the bottom view. This quickly descending air is known as the rear flank downdraft (RFD). At the same time positively-charged particles near the Earth's surface rotate count clockwise if we see them from the bottom view. The downdraft approaches the ground and drags the supercell's rotating mesocyclone towards the ground with it. The connection of descending air and rotating surface particles of the wall cloud may lead to touch down of a tornado. A schematic tornado structure is shown on FIG. 5. A spinning atmospheric phenomenon such as a tornado forms a coil-like structure. The ascending "positive-particle" tornado rotates count clockwise if we see it from the bottom view (in the northern hemisphere). FIGS. 3-5 refer to the Northern hemisphere. The formation of positively-charged tornado is similar in the southern hemisphere, except the "clockwise" rotation switches to the "counterclockwise" rotation and the "counterclockwise" rotation switches to the "clockwise" rotation for each of the events described above.

The movement of charged particles may be similar to a Birkeland current in a space plasma. Birkeland currents are also known as field-aligned electric currents. The field-aligned electric currents create inductors, which develop magnetic fields. The structure of the moving particles may be similar to a double layer in plasma. A double layer is a structure in a plasma and consists of two parallel layers with opposite electric charges. Charged particles that enter the double layer may be accelerated, decelerated, or reflected by the electric field. The structure of the tornado may include a dusty plasma and create plasma flow. Such a tornado may be referred as a dusty current or a spinning dusty current.

Ocean water is an electrolyte. Similar to the above, if similar charged clouds develop over the ocean surface, polarization of the ocean surface may develop. Negative charges go down in the ocean. A cloud-ocean electric field is an increasing field.

Each moving charged particle produces a magnetic field, which influences the movement of the other surrounding charged particles according to the equation:

$$\vec{B} = \frac{\mu_0}{4\pi} \frac{q\vec{v} \times \hat{r}}{r^2} \quad (4)$$

Figure 6:
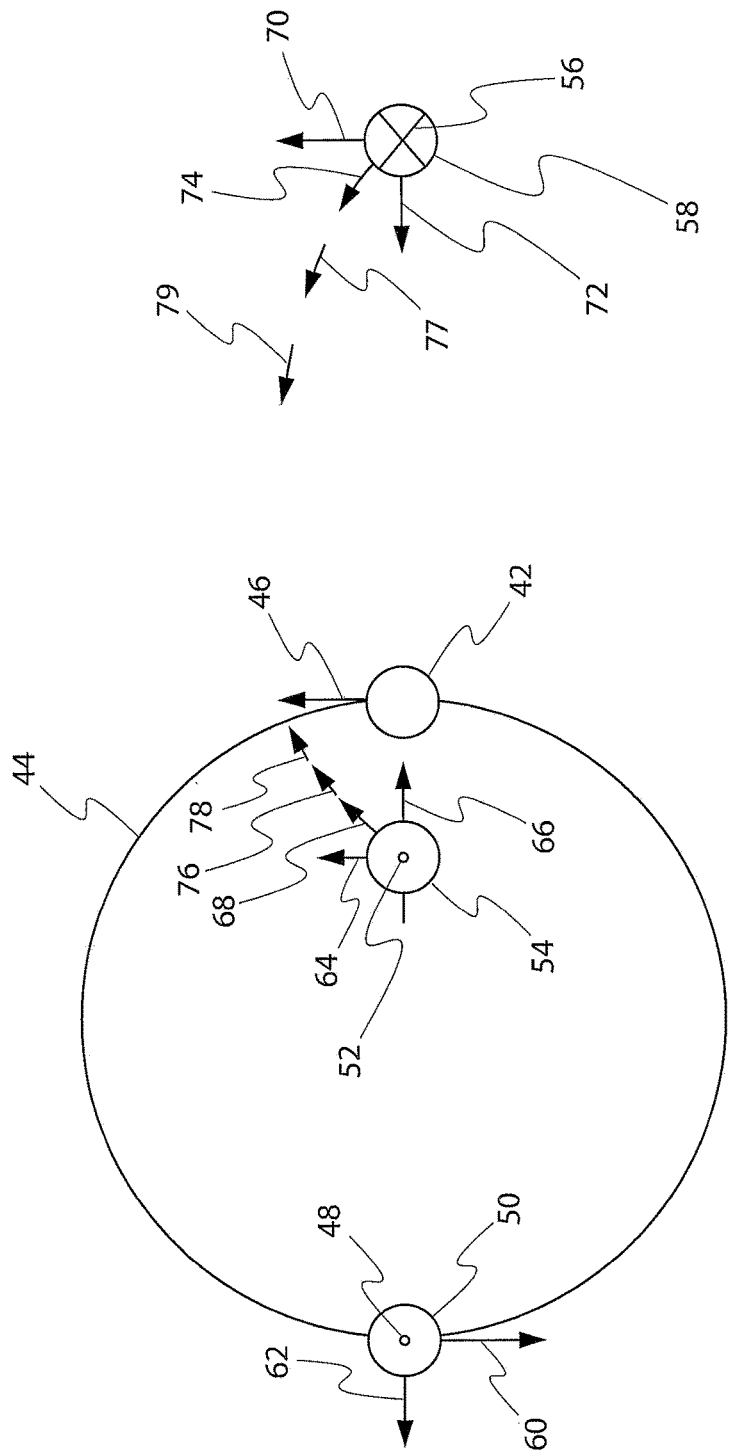
FIG. 6 shows moving charges affecting each other.

Referring now to FIG. 6, according to equation (4) a charge q 42 moving counterclockwise along a circle 44 with velocity $\vec{v}$ 46 produces a leaving-page magnetic field $\vec{B}$ 48 at the location of charge q 50, a leaving-page magnetic field $\vec{B}$ 52 at the location of charge q 54, and an entering-page magnetic field $\vec{B}$ 56 at the location of charge q 58. Charges 42, 50, 54, 58 are positive charges. If the charge q 50 moves counterclockwise with a velocity $\vec{v}$ 60, the charge q 50 is affected by a centrifugal force $\vec{F}$ 62. If the charge q 54 moves with velocity $\vec{v}$ 64 parallel to velocity $\vec{v}$ 46, the charge q 54 is affected by a force $\vec{F}$ 66. Under effect of the force $\vec{F}$ 66 the velocity $\vec{v}$ 64 changes to a velocity $\vec{v}$ 68. If the charge q 58 moves with velocity $\vec{v}$ 70 parallel to velocity $\vec{v}$ 46, the charge q 58 is affected by a force $\vec{F}$ 72.

Under effect of the force $\vec{F}$ 72 the velocity $\vec{v}$ 70 changes to a velocity $\vec{v}$ 74. Under effect of a magnetic field produced by all charges moving along a circle 44 the velocities 68, 74 change to 76, 77. Under effect of a magnetic field produced by all charges moving along a circle 44 the velocities 76, 77 change to 78, 79. The directions of velocities of the charges 54, 58 keep changing until the charges 54, 58 reach the circle 44 and start moving counterclockwise along the circle 44.

Each charge rotating in a charged wall column of a tornado is affected by a magnetic field produced by all other charges rotating in the tornado column. According to equation (3) the magnetic field produces a magnetic force. The magnetic force is directed centrifugal for any particle on the same circle and at the same level, or centrifugal and upward for the particles circulating above. If the effect is strong enough under given conditions, the diameter of the column has a tendency for increase.

If the rotating charged wall column bears positive charges, a positively charged particle moving in the same direction is attracted to the rotating charged wall column by a magnetic force created by the magnetic field that is created by the rotating charged wall column. The above system forms a dusty current. If the rotating charged wall column bears positive charges, a negatively charged particle moving in the same direction outside the rotating charged wall column is repelled from the rotating charged wall column by a magnetic force created by the magnetic field. If the rotating charged wall column bears positive charges, a negatively charged particle moving in the same direction inside the column is repelled from the rotating charged wall column to the center of the column by a magnetic force created by the magnetic field.

The system of particles moving at high velocity creates a zone of a low pressure proximal to a tornado column according to Bernoulli's law. The surrounding particles are soaked in the low-pressure-area of the spinning column. As the net charge of surrounding particles is positive, the total charge of the spinning system increases. Those recently induced charges feed the tornado. The effects of the electric and magnetic fields will be increasing, which increase forces driving the tornado. This will increase significantly the mass of objects soaked in the low-pressure area of the spinning column.

When a tornado column raises high above the Earth's surface, the effect of the Earth's magnetic field becomes weaker. In addition, the net magnetic field depends on the magnetic fields developed by the spinning particles of the tornado. The magnetic field also becomes less homogeneous, which leads to an increase of the radius of the column.

Application of Fields to Spinning Atmospheric Phenomena

A field is an assignment of a physical quantity to every point in space. John Gribbin (1998). Q is for Quantum: Particle Physics from A to Z. London: Weidenfeld & Nicolson. p. 138. Examples are electromagnetic fields, temperature fields or air pressure fields. Other examples are electric fields and magnetic fields. Other examples are combinations of electric, magnetic, thermodynamic, hydrodynamic and any other fields.

The formation, development and movement of a spinning atmospheric phenomenon requires the balance of acting fields supporting the formation, development and movement of the spinning atmospheric phenomenon. The change in strength of any acting field or a group of acting fields can destabilize and destroy the balance of acting fields supporting the spinning atmospheric phenomenon, which may lead to spinning atmospheric phenomenon dissipation. A change in the strength of any acting field or a group of acting fields can be engineered by creating and applying a misbalancing and suppressing field and/or by eliminating any or some of the acting fields. If the misbalancing and suppressing field or eliminating effect of the created and applied field is strong enough to destroy the balance of acting fields, the misbalanced and destabilized acting fields may no longer support the spinning atmospheric phenomenon, which may lead to the dissipation of the spinning atmospheric phenomenon.

In embodiments of the invention, a suppressing field may be used for several different, but beneficial, purposes in the destabilization and suppression of spinning atmospheric phenomenon, mainly tornadoes:

- To change flow characteristics of the tornado in a defined area and in a controlled shape. As described herein, the flow characteristics of the tornado may be changed in several different ways.
- To break the structure of tornado.
- To stop feeding a tornado column by charged particles of the same charge as the charge of the tornado column.
- To assist in affecting the lifecycle of spinning charged particles, which suppressing field forms the principal medium for tornado suppression and destabilization.
- To develop a misbalancing and suppressing field strong enough to change or affect the lifecycle of spinning charged particles. This breaks the structure of the tornado and stops feeding the tornado column.
- To remove energy from a spinning atmospheric phenomenon by transferring electrical energy from a natural spinning electrical circuit of the spinning atmospheric phenomenon serving as a primary coil to an engineered electric circuit serving as a secondary coil using electromagnetic induction. The transferred electrical energy is then transformed into useful output and energy loss as heat. Removing energy from a tornado may lead to tornado structure misbalance and tornado dissipation.

In embodiments of the present invention, an electromagnetic field may be used for several different, but beneficial, purposes in the suppression of spinning atmospheric phenomena mainly tornadoes:

- To change the direction of movement of the lower portion of spinning charged particles in a tornado column.
- To affect the velocity of spinning particles in the tornado column. This change of velocity may destabilize and disrupt a tornado structure and stop feeding the tornado column.
- To develop a device for suppressing a spinning atmospheric phenomenon, which device produces an electromagnetic field, which electromagnetic field affects the spinning atmospheric phenomenon.

An embodiment of the invention includes a system for misbalancing and suppressing a spinning atmospheric phenomenon by installing electrodes in the geographic area where tornado formation is likely. The electrodes are connected to a network comprising a power source delivering an external potential opposite to a natural potential favoring moving particles of the spinning atmospheric phenomenon. In other words, an external electric field may be created by a system of stationary electrodes placed in the area of possible tornadoes. The net electric field produced by both natural and engineered external sources becomes insufficient to support the spinning atmospheric phenomenon. The electrodes may be placed along roads, for example, automobile roads. The shape of the electrodes may vary, and the electrodes may be insulated or partially insulated, and connected to a network—small or expended—comprising a power source. The goal is to deliver a misbalancing and suppressing potential reducing the effect of the natural potential, which natural potential causes and favors the movement of the particles in the tornado column. The suppressing potential will attract the particles of a targeted part of the tornado column. The targeted part of the tornado column may be a lower part of the column. The system for misbalancing and suppressing a tornado through an application of an electric field at a tornado location comprises a system of stationary electrodes, controller, and an altering device, all of which are in electrical communication with a power source.

In embodiments of the present invention, a magnetic field may be used for several different, but beneficial, purposes in the misbalancing and suppression of tornadoes:

- To change the direction of movement of the lower portion of spinning charged particles in tornado column.
- To affect the velocity of spinning particles in the tornado column. This change of velocity may destabilize and disrupt the structure of tornado and stop feeding the column.

An embodiment of the present invention comprises an apparatus for misbalancing and suppressing a tornado, which apparatus produces a magnetic field that affects the tornado. The magnetic field may be created by a system of stationary inductors, conductors or electrodes placed in the area of possible tornadoes. The inductors, conductors or electrodes may be placed along roads, for example automobile roads. The inductors may be insulated or partially insulated, and connected to a network—small or expended—comprising a power source. The goal is to deliver a misbalancing and suppressing magnetic field reducing the effect of the natural fields, which natural fields cause and favor the movement of the particles in the tornado column. The misbalancing and suppressing magnetic field will attract or repel the particles of a targeted part of the tornado column. The targeted part of the tornado column may be a lower part of the column.

Figure 7:
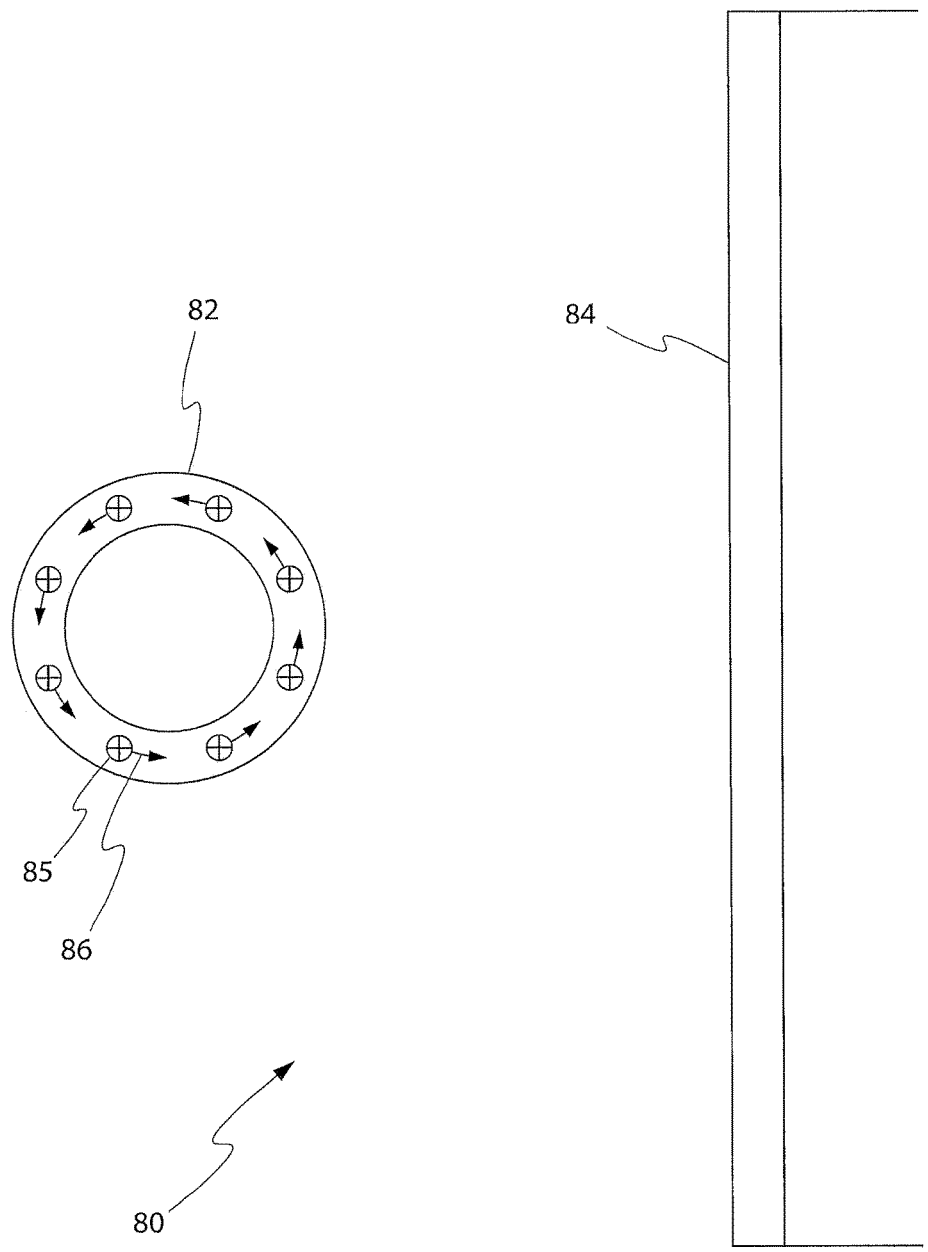
FIG. 7 shows a tornado trap.
Figure 8:
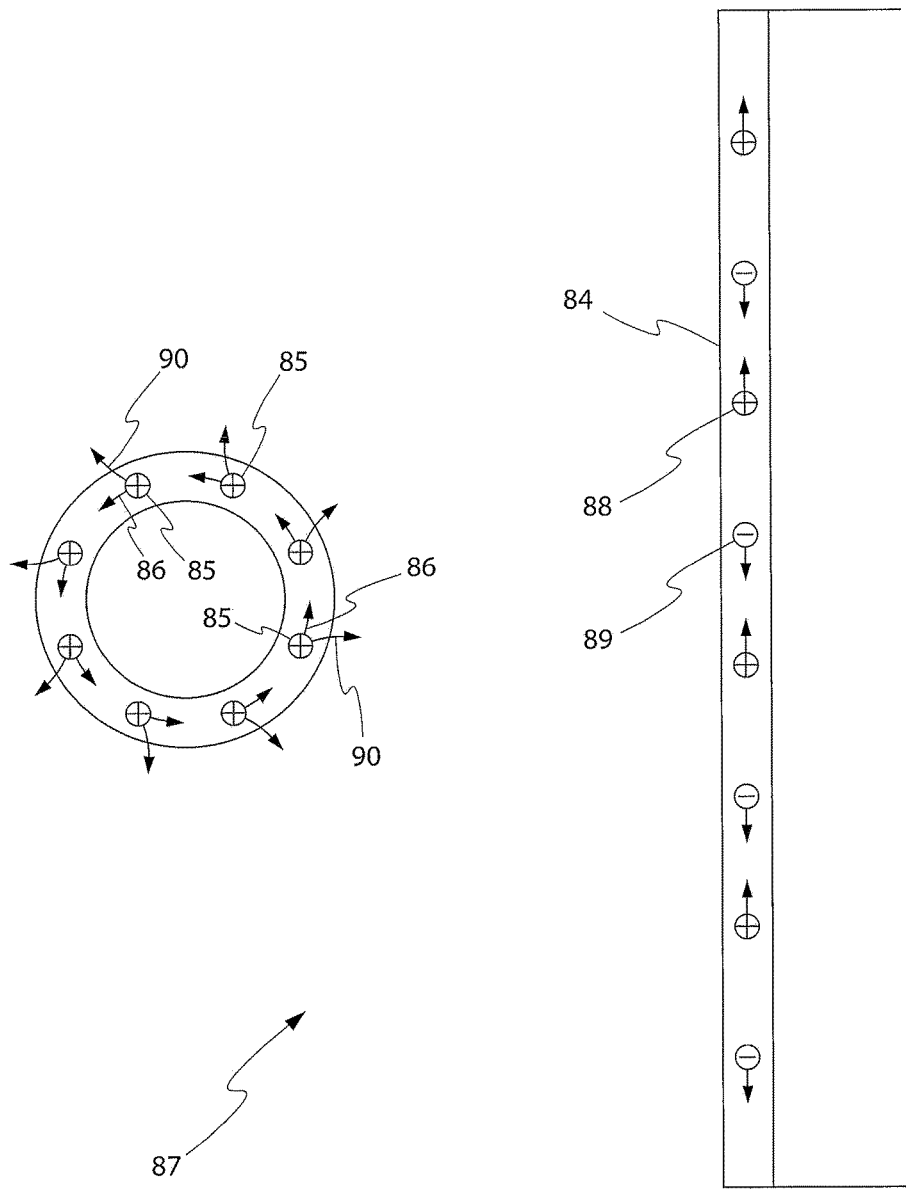
FIG. 8 shows an action of the tornado trap.

Referring now to FIG. 7, an embodiment of the present invention, a tornado trap 80, which controls motion of a tornado 82 is shown. The tornado trap 80 comprises a conductor 84 that is in electrical communication with a controller (not shown on the figure), a power source (not shown on the figure), and a sensor (not shown on the figure). The tornado 82 comprises positive charges 85 moving counterclockwise in the direction 86. FIG. 8 shows an action 87 of the embodiment of the present invention shown in FIG. 7. The sensor detects the tornado 82. The controller connects the power source to the conductor 84. A current is developed in the conductor 84. The current in the conductor 84 comprises holes 88 moving parallel to the nearest tornado charge and electrons 89 moving anti-parallel to the nearest tornado charge. Any two parallel currents attract each other. The direction 86 of the positive charges 85 is changed to 90. The change of the direction of moving tornado charges 85 attracts the tornado 82 to the conductor 84 or destroys the tornado structure. The conductor 84 can comprise multiple inductors.

Alternatively, the current can be directed in the opposite direction. The current in the conductor 84 comprises positive holes moving anti-parallel to the nearest tornado charge and electrons moving parallel to the nearest tornado charge. The tornado 82 comprises positive charges 85 moving counterclockwise at the direction 86. Any two anti-parallel currents repel each other. The change of direction of moving tornado charges repels the tornado 82 from the conductor 85 or affects the tornado structure.

Figure 9:
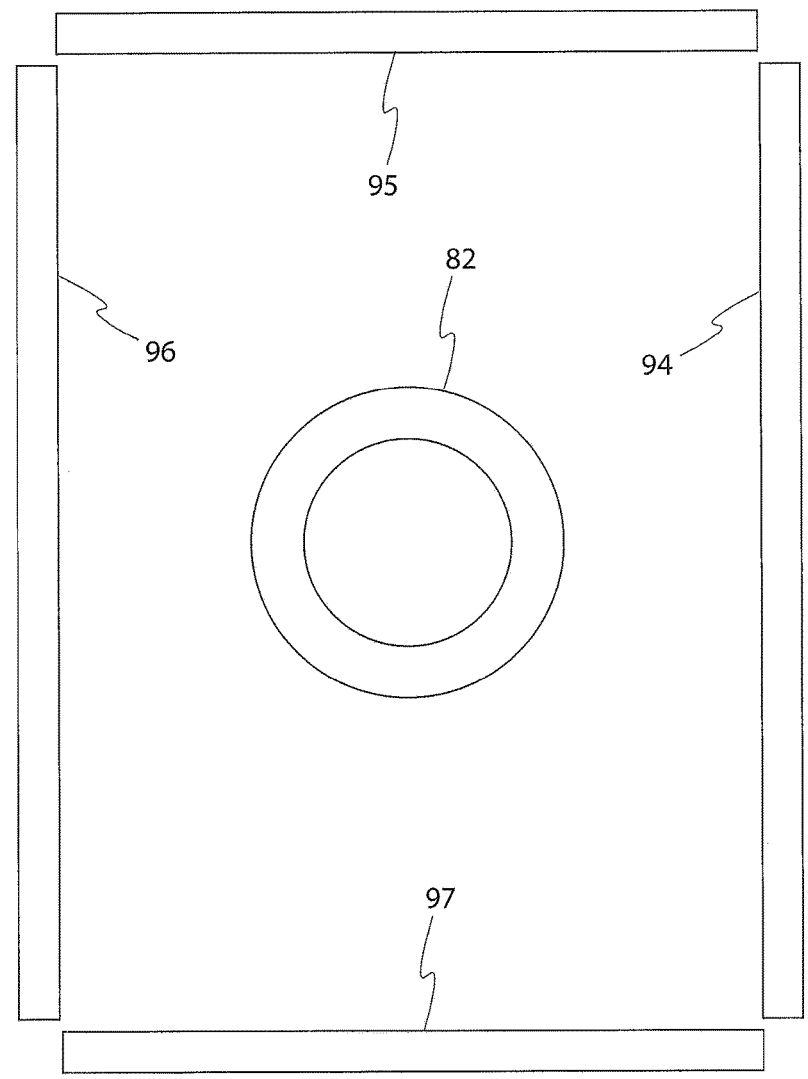
FIG. 9 shows a tornado trap comprising multiple conductors.

Referring now to FIG. 9, an embodiment of the present invention comprising a frame 92 is shown. A system of conductors 94, 95, 96, 97 is in electrical communication with a controller (not shown on the figure), a power source (not shown on the figure), and a sensor (not shown on the figure). The sensor detects the tornado 82. The controller connects the power source to the conductor 94. A current is developed in the conductor 94. Conductors 95, 96, 97 are disconnected from the power source. The current comprises positive holes moving parallel to the direction of the nearest tornado charge and electrons moving anti-parallel to the direction of the nearest tornado charge. Any two parallel currents attract each other. The tornado 82 is forced to move closer to conductor 94 and inside the frame 92 by the current in conductor 94. After the tornado enters the frame 92 area the sensor and the controller connect conductors 95, 96, 97 to the power source. The current developed in conductors 94, 95, 96, 97 comprises positive holes moving anti-parallel to the nearest tornado charge and negative charges moving parallel to the nearest tornado charge. Any two anti-parallel currents repel each other. The tornado 82 is repelled from each of the conductors 94, 95, 96, 97 and is kept inside the tornado trap. The conductors 94, 95, 96, 97 form a circuit. The circuit conductor can be placed around buildings or any other locations to be protected. The current in the circuit conductor repels rotating charges of a tornado 82, which protects the buildings and locations from a tornado strike.

Figure 10:
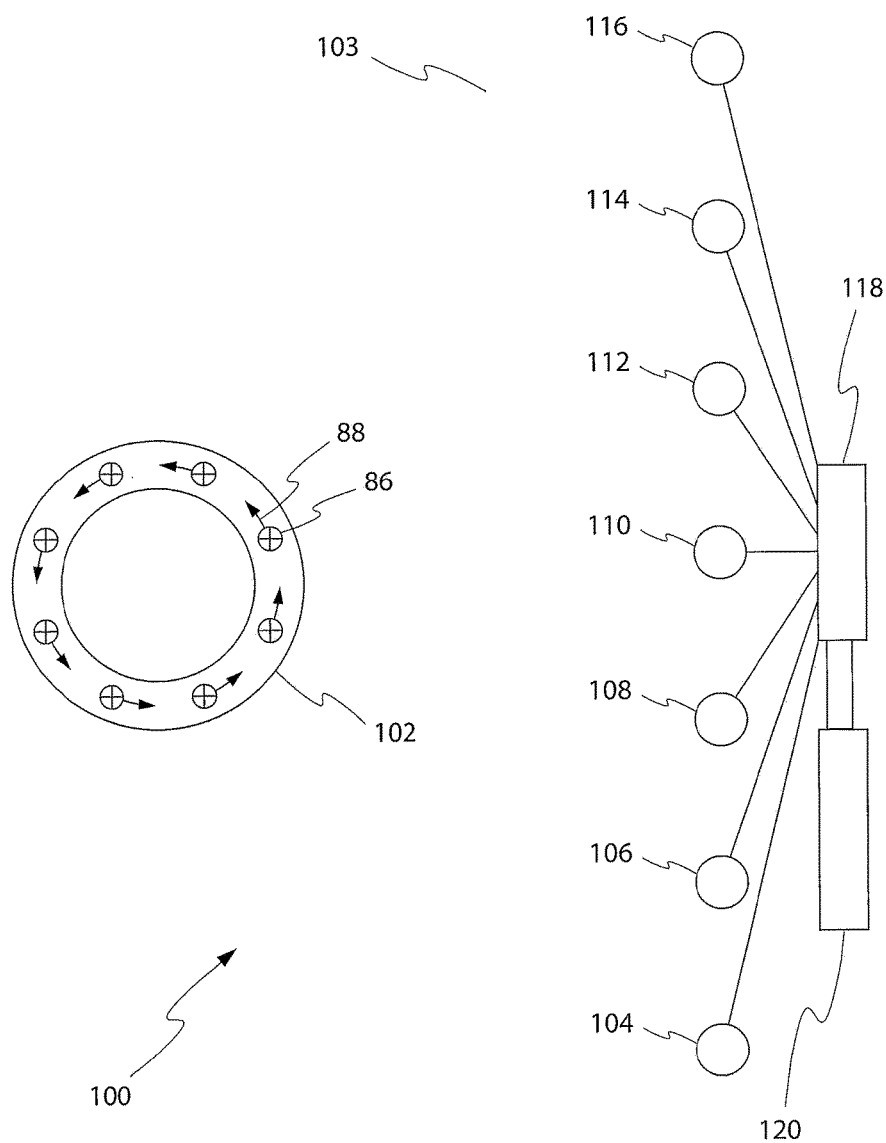
FIG. 10 shows a tornado trap comprising multiple electrodes.

Referring now to FIG. 10, an embodiment of the present invention comprising a tornado trap 100 that controls motion of a tornado 102 is shown. The tornado trap 100 has a multitude of electrodes 103 located in the area of possible tornadoes. The multitude of electrodes 103 includes electrodes 104, 106, 108, 110, 112, 114, 116 and other electrodes, which electrodes 104-116 and other electrodes are in electrical communication with a controller 118, a power source 120, and a sensor (not shown on the figure). The tornado 102 comprises positive charges 86 moving counter-clockwise in the direction 88. According to tornado location and tornado direction the controller 118 determines the electrodes 104-116 to be connected to the power source 120. A positive potential is applied to the electrodes 104-116 in set sequences. For example, the potential is applied to electrode 104. Then electrode 104 is disconnected from the power source 120. The potential is applied to electrode 106. Then electrode 106 is disconnected from the power source 120. The potential is applied to electrode 108. Then electrode 108 is disconnected from the power source 120. The potential is applied to electrode 110. Then electrode 110 is disconnected from the power source 120. The potential is applied to electrode 112. Then electrode 112 is disconnected from the power source 120. The potential is applied to electrode 114. Then electrode 114 is disconnected from the power source 120. The potential is applied to electrode 116. Then electrode 116 is disconnected from the power source 120. The potential can be applied in various orders to the electrodes 104-116 to drive the tornado 102 in a selected direction. A sequential potential application as disclosed above can drive the tornado 102 in a linear manner. Alternating the potential simulates an electric current, which potential change can be directed the way it attracts or repels the tornado 102 as was shown for the embodiment of FIG. 8.

The conductor of tornado trap 100 can comprise multiple loops, which multiple loops increase a magnetic field produced by the conductor.

The tornado trap 100 or a device of similar performance is placed in front of houses, villages, towns, cities or other objects to be protected. Tornado traps 100 can be placed around the protected objects. Tornado traps 100 can be manufactured and offered to customers for personal or corporate usage for protection from destructive spinning atmospheric phenomena.

In another embodiment of the present invention, a mobile power source can deliver a power source to a tornado, or to the prospective path of the tornado, or behind the tornado, or on the side of the tornado, or below the tornado, or above the tornado. The power source produces a potential developing potential difference between the power source and the tornado. The moving power source may be a motor vehicle, for example a heavy armoured vehicle, which cannot be destroyed by a tornado. The motor vehicle can deliver the potential through wires it places in the area or using an existing network of wires. The motor vehicle may be externally operated (remote controlled). The moving power source can be an aircraft carrying a long insulated wire with an opening at the end. The aircraft may be destroyed in the process, so an unmanned aircraft may be preferred. For example, the aircraft may be externally operated (remote controlled).

Figure 11:
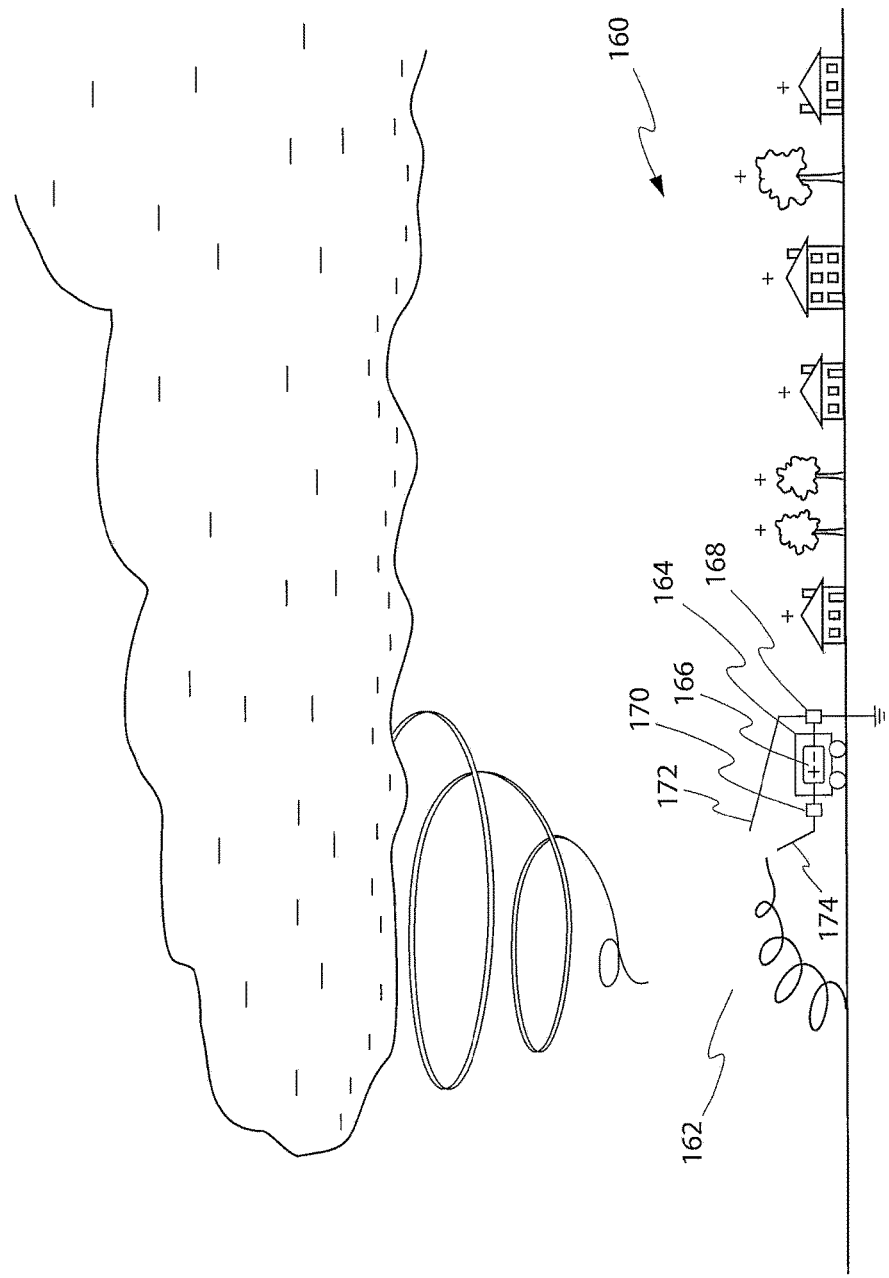
FIG. 11 shows a system for suppressing a tornado through an application of an electric potential at a tornado location by a vehicle comprising a power source, a controller (negative side), an altering device (positive side), an electrode and an electrode.

Referring now to FIG. 11, an embodiment of the present invention comprising a system 160 for misbalancing and suppressing a tornado is shown. This system operates through an application of an external electric potential at a tornado location 162 by a vehicle 164 comprising a power source 166, a controller (negative side) 168, an altering device (positive side) 170, a first electrode 172 and a second electrode 174. Electrodes 172, 174 are in electrical communication with the power source 166, the controller 168, and the altering device 170.

The vehicle 164 or a device of similar performance is placed in front of houses, villages, towns, cities or other objects to be protected. The vehicle 164 or similar devices are placed around the protected objects. The vehicles 164 or similar devices can be manufactured and offered to customers for personal or corporate usage for protection from destructive spinning atmospheric phenomena.

Removing or Converting Energy from Spinning Atmospheric Phenomena

Another embodiment of the invention is a system for affecting a spinning atmospheric phenomenon such as a tornado by removing a portion of the energy of the spinning atmospheric phenomenon. The flow of spinning charged particles of the spinning atmospheric phenomenon is a spinning electric current, which spinning electric current produces a magnetic field. As the spinning atmospheric phenomenon is highly mobile a magnetic flux is changing. According to Faraday's law of induction the change of the magnetic flux develops the instantaneous voltage in a secondary circuit. Electrical energy of the spinning atmospheric phenomenon, which serves as a primary circuit, is converted to electrical energy in a secondary coil or windings located proximal to the pass of the spinning atmospheric phenomenon.

Figure 12:
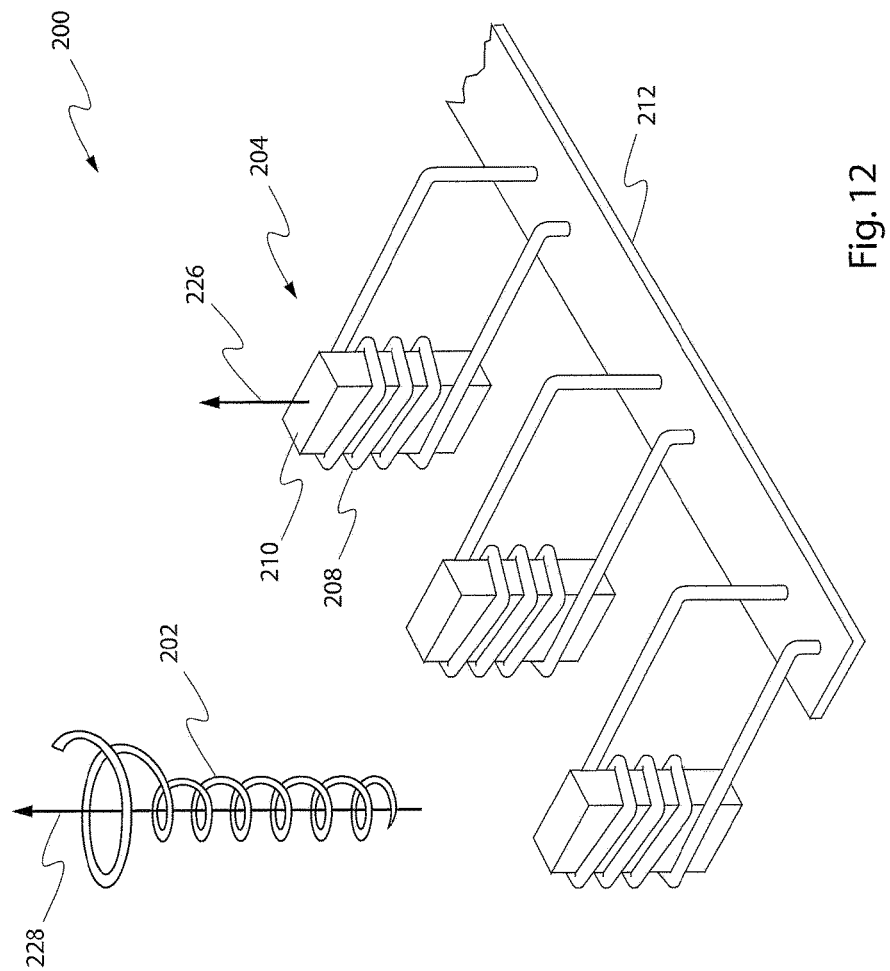
FIG. 12 shows a system for affecting a tornado by receiving energy from the tornado using a transformer receiver.

Referring now to FIG. 12, an embodiment of the present invention comprising a system 200 for affecting a tornado 202 by removing a portion of tornado's energy using a transformer receiver 204 is shown. The transformer receiver 204 comprises a coil 208 wrapped around a metallic (ferromagnetic) core 210. The transformer receiver 204 is placed in the geographic area of possible tornado activity. The coil 208 serves as a secondary circuit. The secondary circuit is in electrical connection with a load 212. When the tornado 202 is passing by, an electromotive potential is developed in the secondary circuit. The tornado 202 and the tornado receiver 204 form a tornado energy transformer. Electrical energy will flow from the primary circuit through the transformer receiver 204 to the load 212. Converted energy consists of a consumer portion and a lost portion, which is lost as heat. The consumer portion may be immediately consumed, transformed into work or another type of energy, or stored at grid energy storage or accumulator (not shown) for later consumption.

An alternative embodiment comprises a group of coils 208 that serve as secondary circuits in electrical communication with a load 212 and grid energy storage (not shown) placed in the area of possible spinning atmospheric phenomena. When a tornado 202 is passing by, an electromotive potential is developed in the secondary circuit. Electrical energy will flow from the primary circuit through the transformer receiver 204 to the load 212. Converted energy consists of a consumer portion and a lost portion, which is lost as heat. The consumer portion may be immediately consumed, transformed into work or another type of energy, or stored at grid energy storage or accumulator (not shown) for later consumption. Received energy also may be used by a tornado trap and for other purposes to suppress and disrupt a tornado.

Another alternative embodiment comprises a transformer receiver 204, where the axis 226 of transformer receiver 204 makes any angle between 0° and 360°, or between 0° and 90°, with the tornado axis 228. A group of transformer receivers 204 also can be used.

The group of transformer receivers can comprise transformer receivers each having a coil on a ferromagnetic core. The ferromagnetic core comprises two ferromagnetic extensions directed towards possible tornadoes. The coils serve as secondary circuits. Extended cores increase the level of magnetic coupling between the air core of the tornado and the ferromagnetic core of the coil, which increases an effective magnetic flux delivered to the coils and the amount of energy converted from the tornado to the transformer receiver.

As leakage due to the limited magnetic permeability of the air between the spinning atmospheric phenomenon 202 and the transformer receiver 204, only a small percent of spinning atmospheric phenomenon energy will be converted. To increase of the rate of energy takeover from spinning atmospheric phenomenon 202, the space between the spinning atmospheric phenomenon 202 and the transformer receiver 204 can be filled with ferromagnetic particles, a ferromagnetic polymer, or any another media increasing permeability, which allows more magnetic flux to be transferred to the transformer receiver 204. Any increase in the converted portion of energy means an appropriate increase in energy loss by the spinning atmospheric phenomenon 202. Decrease of spinning atmospheric phenomenon energy loss increases the probability of spinning atmospheric phenomenon 202 misbalance and spinning atmospheric phenomenon 202 dissipation.

Tesla coils or a receiving part of Tesla coils can be used as a transformer receiver. Tesla coils are described by Nicola Tesla in U.S. Pat. No. 645,576 entitled System of Transmission of Electrical Energy and U.S. Pat. No. 649,621 entitled Apparatus for Transmission of Electrical Energy, both of which describe new and useful combinations of transformer coils. The production of currents of very high potential could be attained in these coils. Tesla coils also are described by Nicola Tesla in U.S. Pat. No. 723,188 entitled Method of Signaling and U.S. Pat. No. 725,605 entitled System of Signaling, which describe coils with elevated transmitter capacitance with an Earth electrode. The device described in U.S. Pat. No. 1,119,732 entitled Apparatus for Transmitting Electrical Energy is a high-voltage, air-core, self-regenerative resonant transformer that generates very high voltages at high frequency. These various Tesla coils can be used in the present invention.

A transformer receiver or a system of transformer receivers are placed under the Earth's surface. A transformer receiver or a system of transformer receivers comprise an anchor or a group of anchors to avoid the transformer receiver being soaked into a tornado column.

The transformer receiver 204 or a device of similar performance is placed in front of houses, villages, towns, cities or other objects to be protected. The transformer receiver 204 or similar devices can be manufactured and offered to customers for personal or corporate usage for protection from destructive spinning atmospheric phenomena.

Reducing Natural Fields Supporting Spinning Atmospheric Phenomenon

Other embodiments of the present invention include methods of misbalancing and suppressing a spinning atmospheric phenomenon by reducing the magnitude of electric field, which said electric field is favoring the said spinning atmospheric phenomenon.

Other embodiments of the present invention include a system for misbalancing and suppressing a spinning atmospheric phenomenon by neutralizing the potential between clouds and Earth's outer surface electric field. The system alters this clouds-Earth's surface electric field. Earth's outer surface consists of continents and islands and the remaining part covered by water, mainly salt-water oceans.

Another embodiment of the present invention includes a system for misbalancing and suppressing a waterspout by neutralizing a clouds-ocean surface electric field. The system alters the clouds-ocean surface electric field.

Embodiments of the invention include a method of misbalancing and suppressing a spinning atmospheric phenomenon by reducing a clouds-Earth's outer surface electric field by irradiating the clouds to neutralize negative charges of the bottom of the cloud. Irradiation can be performed by beta particles, gamma rays, laser, free electron laser, or a high energy particle accelerator tube. For example, the clouds can be irradiated with positively-charged particles to neutralize negative charges of the bottom of the cloud, or with negatively-charged particles to neutralize positive charges of the bottom of the cloud, as appropriate. Similarly, a clouds-ocean (water) surface electric field can be reduced by irradiating the clouds with positively charged particles to neutralize negative charges of the bottom of the cloud, or with negatively-charged particles to neutralize positive charges of the bottom of the cloud, as appropriate.

Specific examples of irradiating spinning atmospheric phenomenon include misbalancing and suppressing a tornado by reducing clouds-Earth's outer surface electric field by irradiating the clouds, such as the tornado column, to neutralize negative charges of the bottom of the cloud. Irradiation can be performed by beta particles, gamma rays, a laser, or a free electron laser. Likewise, this method can be used to destabilize and suppress tornado formation by irradiating a rear flank downdraft by positive-charged particles to neutralize negative charges of the rear flank downdraft.

Figure 13:
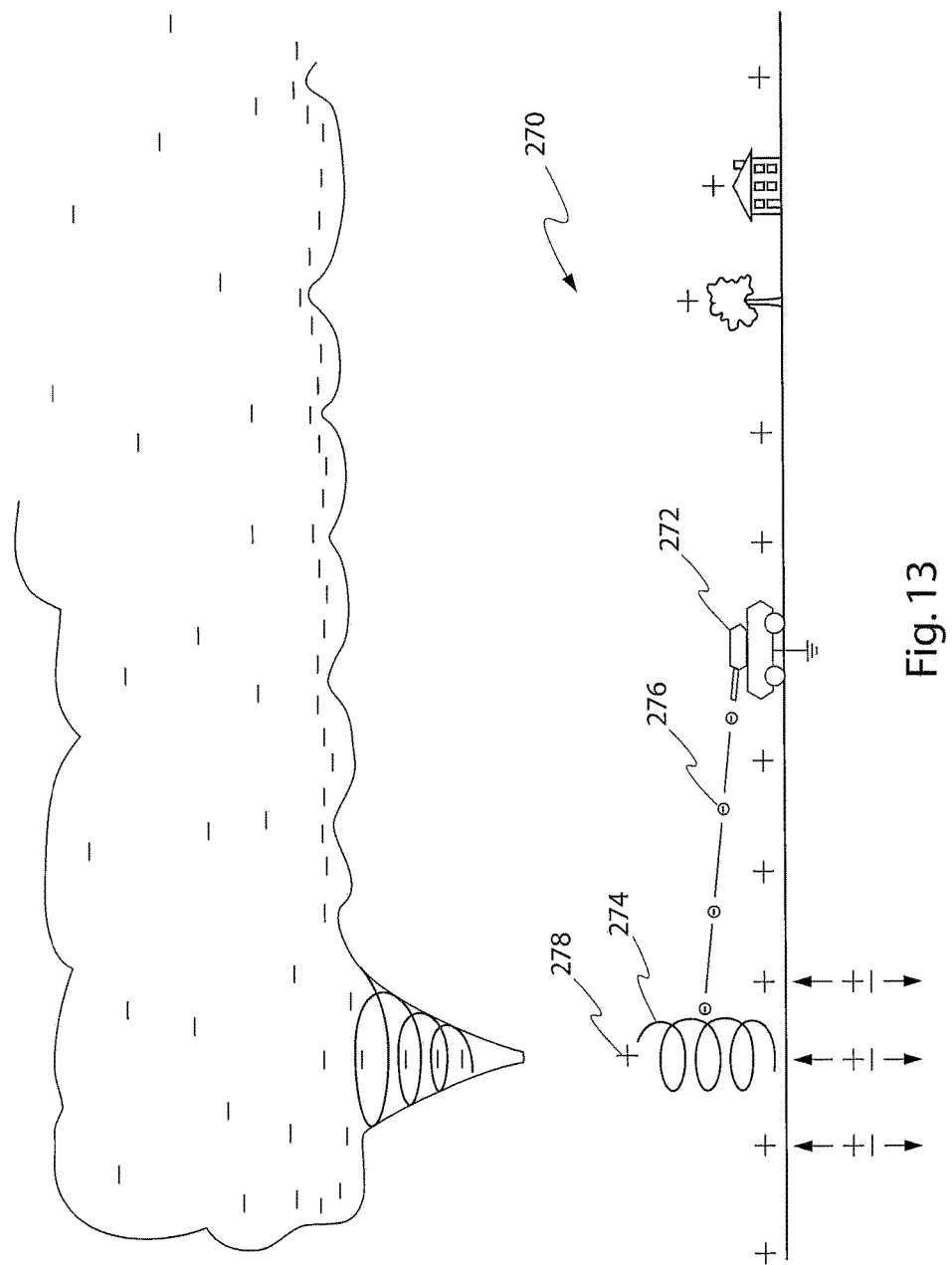
FIG. 13 shows a system for suppressing a tornado, which said suppressing system comprises an irradiating device delivering negatively charged particles to a rotating wall cloud.

Referring now to FIG. 13, an embodiment of the present invention comprising a system 270 for misbalancing and suppressing a spinning atmospheric phenomenon is shown. The system comprises a vehicle 272 comprising an irradiating device, which irradiating device is shown irradiating a rotating wall cloud 274 with negatively-charged particles 276 to neutralize positive charges 278 of the rotating wall cloud 274.

Figure 14:
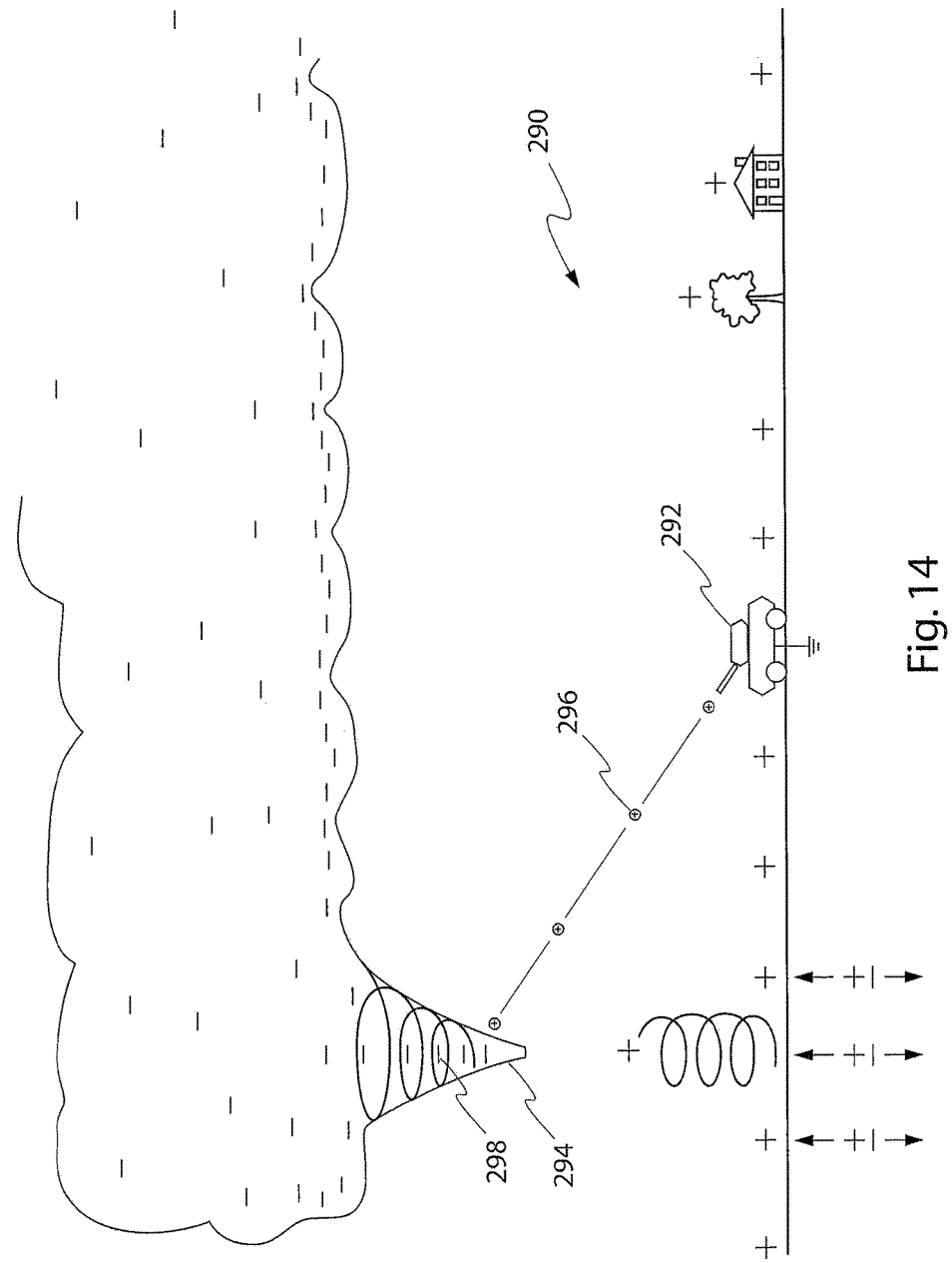
FIG. 14 shows a system for suppressing a tornado, which said suppressing system comprises an irradiating device delivering positively charged particles to the bottom of the cloud.

Referring now to FIG. 14, an embodiment of the present invention comprising a system 290 for misbalancing and suppressing a spinning atmospheric phenomenon is shown. The system comprises a vehicle 292 comprising an irradiating device shown irradiating a rotating rear flank downdraft 294 with positively-charged particles 296 to neutralize electrons 298 of the bottom of the cloud.

Referring now to FIG. 15, an embodiment of the present invention comprising a system 300 for misbalancing and suppressing a spinning atmospheric phenomenon is shown. The system comprises a vehicle 302 comprising an ultrasound source shown irradiating a rotating rear flank downdraft 304 and a rotating wall cloud 306 by ultrasound.

In this embodiment, a tornado column is irradiated with ultrasound. Other embodiments of the invention include irradiating a rotating wall cloud by ultrasound. Still other embodiments of the invention include irradiating a rear flank downdraft column by ultrasound.

Embodiments of the invention also include a method of misbalancing and suppressing a spinning atmospheric phenomenon by neutralizing clouds-Earth's surface electric field by delivery of positively charged particles to the bottom of clouds to neutralize electrons of the bottom of the cloud. In one such embodiment, if the bottom of the cloud is negatively charged, delivery of the negatively charged particles to the bottom of the cloud above a tornado leads to dramatic increase of the electric field. An electric field increase can break the structure of the tornado by speeding up the tornado. The dramatic increase of the electric field leads to lightning, which causes an electrical discharge at the bottom of the cloud and decreases the electric field favoring tornado. Final reduction of the electric field leads to destabilizing and suppressing a spinning atmospheric phenomenon by causing lightning in the local-to-tornado areas.

Other embodiments of the present invention include:

Methods for misbalancing and suppressing a tornado using electromagnetic shielding. Materials used for electromagnetic shielding include sheet metal, metal mesh, metal foam, plasma (ionized gas), biodegradable conducive polymers, and layers of negatively charged particles on a water surface. One such method comprises a Faraday cage. Faraday cages can be formed, for example, from metal sheets, non-horizontal metal sheets, and laser beams. The Faraday cage effect protects the area from tornado and other electrostatic discharges.

Methods of misbalancing and suppressing a spinning atmospheric phenomenon by developing an internal electric field to reduce the effect of the primary electric field, which primary electric field favors the spinning weather atmospheric phenomenon.

Methods for developing a magnetic field strong enough to change the velocity of movement of spinning charged particles. The velocity change includes direction change and speed change. The direction change breaks the structure of tornado and stops feeding the column. The speed change breaks the structure of tornado and stops the feeding the column. The magnetic field is used for suppressing a tornado, and is caused by the magnetic field developed by the moving charges, which moving charges apply stress on equilibrium of magnetic field in the tornado column. Also, a magnetic field bender deflecting the Earth's magnetic field away from the spinning currents of the tornado can be used. The system suppresses the tornado by applying stress affecting the field equilibrium in the tornado column.

Methods of misbalancing and suppressing a spinning weather atmospheric phenomenon comprising the neutralization of charges of spinning atmospheric currents using charged materials and/or materials that can be products of chemical reactions.

Systems for neutralizing the charges of spinning atmospheric currents for misbalancing and suppressing a tornado, wherein the charges of spinning currents are neutralized from inside or outside of a tornado. Non-charged particles may not be affected by an electric field neither by a magnetic field. For example, an electron gun can be used for neutralizing the charges of spinning atmospheric currents. The electron gun is delivered to a tornado or stored in the geographic area of possible tornado activity. The electron gun delivers accelerated electrons, which recombine with positive charges in a tornado column or any other part of the tornado, and neutralize it by the relaxation of electrons in excited states to lower energy states after they have recombined with ions. Non-charged particles may not be affected by an electric field neither by a magnetic field.

In an alternative embodiment, an intense negative ion source can be used for neutralizing the charges of spinning atmospheric currents and suppressing a tornado. The intense negative ion source is delivered to a tornado or stored in the geographic area of possible tornado activity. The intense negative ion source delivers accelerated electrons, which recombine with positive charges in a tornado column or any other part of the tornado and neutralize it by the relaxation of electrons in excited states to lower energy states after they have recombined with ions. Non-charged particles are not affected by electric field neither by magnetic field.

In another alternative embodiment, a laser can be used for neutralizing the charges of spinning atmospheric currents and suppressing a tornado. The laser is delivered to a tornado or stored in the geographic area of prospective tornado activity. The laser generates a laser beam, which neutralizes the charges of spinning currents while passing through a tornado. Alternatively, the laser beam can be used to evaporate moisture in the area of tornado.

In another embodiment of the present invention, an electromagnetic pulse can be used for suppressing the tornado.

In another embodiment of the present invention, charged materials may be used for several different, but beneficial, purposes in the suppression of tornadoes. The charge of said charged materials is opposite to the charges contained in the spinning flow of the tornado column. This embodiment includes a system for releasing charges stored in the geographic area of possible tornado activity. The charges in the form of charged materials are released by the system when necessary to neutralize the opposite charged particles of a tornado column. The charged materials may include but are not limited to electrolytes, polyelectrolytes, ions, polyios, macroions, and ionomers. The charged material also can be a liquid of opposite charge to the charge of tornado particles, which liquid is discharged from a reservoir in order to contact the moving tornado. The charged particles can be delivered to a tornado, or to the prospective path of the tornado, or behind the tornado, or on the side of the tornado, or below the tornado, or above the tornado.

In certain embodiments, the charged particles comprise a polymer having a negative charge in its chain or a negative backbone charge, a polymer having a positive charge in its chain or a positive backbone charge, a biodegradable polymer having a negative charge in its chain or a negative backbone charge, or a biodegradable polymer having a positive charge in its chain or a positive backbone charge.

The charged particles can be delivered by aircraft, a ground-based motor vehicle, a ballistic charge, or a shell. For example, an aircraft can deliver negatively charged particles by releasing them above or in front of a tornado. The aircraft can comprise a tank for transportation of charged particles. A ground-based motor vehicle also can be used to deliver negatively charged particles by driving into the tornado and releasing the charged particles into the tornado. Alternatively, a ballistic charge transport can deliver negatively charged particles to a tornado. Likewise, a shell filled with negatively charged particles can be used. The shell detonates inside the tornado column, for example because of low pressure inside the tornado column. An aircraft or a ground-based motor vehicle can deliver such a shell filled with negatively charged particles.

Another embodiment of the present invention comprises a system for neutralizing the charges of spinning currents for suppressing a tornado by using materials charged by friction. The materials are charged by friction to the charge opposite to the charge of the spinning currents. To intensify the effect of charging by friction, the said materials can be irradiated by ultrasound or microwaves to produce vibration, thus increasing friction.

Another embodiment of the present invention comprises a system for neutralizing the charges of spinning currents of the tornado column for suppressing a tornado by delivering low or high affinity molecules to a tornado. Examples of low affinity materials include for example, leather, rabbit fur, nylon, polyamides, polyamide resin blends, wool, fur, lead, silk, aluminum, paper, cotton, amide group-containing materials, amino acids, heparin, endothelin, vasopressin, and interleukin. Low affinity biodegradable molecules also can be used. Examples of high affinity materials that can be delivered to a tornado include for example: teflon, silicon, poly(vinyl chloride), polyethylene, polyurethane, saran wrap, polystyrene, styrofoam, polyester, amber, peptides, proteins, fatty acids, ligands, bisphosphonate, etc. High affinity biodegradable molecules also can be used.

Alternatively, the system for neutralizing the charges of spinning currents of the tornado column for suppressing a tornado can comprise a delivery of porous materials to a tornado, increasing moisture concentration in the wall of the tornado column by using for example water or ionized water, or a delivery of a biodegradable polymer carrying charges opposite to the charge of the tornado or hurricane.

The present invention also includes a system for neutralizing the charges of spinning currents for suppressing a spinning weather atmospheric phenomenon by creating charged plasma in the spinning atmospheric phenomenon. Creating negatively charged plasma in the spinning atmospheric phenomenon neutralizes the positively charged spinning currents in the spinning atmospheric phenomenon. Creating positively charged plasma in the spinning atmospheric phenomenon neutralizes the negatively charged spinning currents in the spinning weather atmospheric phenomenon. Charged dusty plasma also can be used.

Another embodiment of the present invention is a method for misbalancing and suppressing a tornado by products of chemical reactions of at least two reactants. The reactants are stored in the geographic area of possible tornado activity or in a delivery vehicle. The chemical reaction of reactants is started when triggered by an approaching tornado. The chemical reaction of the reactants produces products comprising charges that are opposite to the charges of spinning currents in a tornado.

The chemical reaction of the reactants can be a polymerization reaction inside the tornado. For example, the polymerization reaction inside a tornado develops a cross-linked polymer network that can slow down the mobility of charged particles of the tornado. Alternatively, the polymerization reaction inside a tornado can develop a charged cross-linked polymer network, which slows down the mobility of charged particles of the tornado.

This method can use pressurized gas cylinders and tanks that explode inside the tornado, producing what is called a BLEVE (Boiling Liquid Expanding Vapor Explosion). Some chemical products such as ammonium nitrate fertilizers can also explode.

Alternatively, the reactants can be delivered to tornado by a diffused spray.

A tornado may be formed by upward negative charges. Upward negative charges form a similar spinning wall cloud but in a clockwise direction. Positive charges going down will form the same clockwise spinning, which leads to touch down of the tornado. For a negatively charged spinning atmospheric phenomenon all of the described above methods and systems must deliver positive charges instead of negative charges.

Electrospinning of fibers is used to simulate the creation, development, movement and dissipation of tornadoes. Controlled electrospinning of fibers produces the data about acting fields, concentrations, charge mobility, dimensions, etc., which data can provide necessary leads for the development of systems suppressing a tornado, as electrospinning of fibers is considered to have several analogies to the spinning of a tornado.

The foregoing detailed description of the preferred embodiments and the appended figures have been presented only for illustrative and descriptive purposes and are not intended to be exhaustive or to limit the scope and spirit of the invention. The embodiments were selected and described to best explain the principles of the invention and its practical applications. One of ordinary skill in the art will recognize that many variations can be made to the invention disclosed in this specification without departing from the scope and spirit of the invention.

What is claimed is:

1. A method for misbalancing or suppressing a spinning atmospheric phenomenon by (1) subjecting the spinning atmospheric phenomenon to an electromagnetic field, wherein the electromagnetic field destabilizes and disrupts the spinning atmospheric phenomenon, and wherein the electromagnetic field is created by applying a potential to each of a plurality of conductors in an order designed by a controller to create a simulated charge movement, and (2) using the simulated charge movement to attract or repel the spinning atmospheric phenomenon.

2. A method for misbalancing or suppressing a spinning atmospheric phenomenon by (1) subjecting the spinning atmospheric phenomenon to an electromagnetic field, wherein the electromagnetic field destabilizes and disrupts the spinning atmospheric phenomenon, and wherein the electromagnetic field is created by applying a potential to each of a plurality of conductors in an order designed by a controller to create a simulated charge movement, and wherein the controller and an altering device are in electrical communication with an electric potential source, and (2)

using the simulated charge movement to attract or repel the spinning atmospheric phenomenon.

* * * * *